United States Patent
Chen et al.

(10) Patent No.: US 7,181,235 B2
(45) Date of Patent: Feb. 20, 2007

(54) HYBRID METHOD FOR ADJUSTING DOWNLINK TRANSMITTED POWER

(75) Inventors: Xiaohua Chen, Randolph, NJ (US); Walid E. Nabhane, Mount Laurel, NJ (US); Alexandro Salvarani, Edison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 515 days.

(21) Appl. No.: 10/385,019

(22) Filed: Mar. 10, 2003

(65) Prior Publication Data

US 2004/0180684 A1  Sep. 16, 2004

(51) Int. Cl.
*H04B 1/00* (2006.01)
*H04Q 7/20* (2006.01)
(52) U.S. Cl. .................................. 455/522; 455/69
(58) Field of Classification Search .............. 455/13.4, 455/522, 69, 515, 453; 370/311, 337, 347, 370/376, 458, 459, 508, 321, 442, 318, 345, 370/342, 335
See application file for complete search history.

(56) References Cited

U.S. PATENT DOCUMENTS

| | | | | |
|---|---|---|---|---|
| 5,008,883 A | * | 4/1991 | Eizenhofer et al. | 370/348 |
| 6,594,499 B1 | * | 7/2003 | Andersson et al. | 455/522 |
| 2003/0177272 A1 | * | 9/2003 | Shimosakoda | 709/248 |
| 2003/0223400 A1 | * | 12/2003 | Knisely et al. | 370/346 |

* cited by examiner

*Primary Examiner*—Quochien B. Vuong
*Assistant Examiner*—Dominic E. Rego

(57) ABSTRACT

An algorithm calculates a correction value to be applied to a slot in an adjustment period for power correction. The adjustment period is divided into segments having a plurality of slots, and a target power value is determined for each segment. For each slot, the algorithm determines whether adding a correction value in a given slot would bring the actual accumulative adjustment value closer or farther from the target power value for the segment corresponding to the given slot. The correction value is added to consecutive slots in the segment. The algorithm also checks the total amount of adjustment applied to the slots over a sliding adjustment window to make sure that the total amount of adjustment applied to the slots in the window do not exceed a predetermined maximum threshold.

14 Claims, 2 Drawing Sheets

HYBRID METHOD FOR ADJUSTING DOWNLINK TRANSMITTED POWER

BACKGROUND OF THE INVENTION

1. Field of the Invention

The present invention relates to wireless communication systems.

2. Description of the Related Art

Communication systems such as wireless systems are designed to meet various demands of subscribers. Service providers continuously seek ways to improve the overall performance of the communication system. As wireless communications become more and more popular for subscribers to obtain data (i.e., email or information from the internet), communication systems must be capable of a higher throughput.

There are two directions of data flow in such systems. Communications from a base station to a mobile device are considered to flow in a downlink direction while the communications originating at the mobile device are considered to flow in an uplink direction. Most of the work in this area has focused on the downlink flow of information, which is to the mobile devices (typically from a base station, called "Node B" in the Universal Mobile Telecommunications Standard, or UMTS).

In general, a given service coverage area is divided into multiple cells, with a base station (Node B) associated with one or more cells, as shown in FIG. 1. A scheduler at the base station selects a user for transmission at a given time, and adaptive modulation and coding allows selection of an appropriate transport format (modulation and coding) for the current channel conditions seen by the user. Accordingly, in scheduling, the Node B grants permission to one or more users at a time, rather than to allow data users to transmit autonomously. Typically, this is based on an estimate of each user's radio link quality in one of the downlink and uplink.

When user equipment is moved between cell sites, the Node B in each cell site prevents dropped signals by holding the signal in both cell sites until the transfer between cell sites is completed. This process is called a "soft handover." More particularly, the Node B in the cell where the user equipment is originally located does not cut off the signal until it receives information from the Node B in the destination cell that it is maintaining the signal. Each Node B involved in the soft handover is considered part of an active set.

Each Node B also participates in power control, as it enables the user equipment to adjust its power using downlink transmission power control (TPC) commands via an inner-loop power control on the basis of uplink TPC information. Ideally, each Node B radio link involved in the soft handover receives the same TPC commands to control the transmitted power of the downlink channels (e.g., downlink data channels and downlink control channels). Due to errors in the uplink control channel radio links, however, the TPC commands received by each Node B may be different; for example, during soft handover, stronger radio links will have a lower probability of TPC bit errors than weaker radio links. If the radio link is extremely weak, the TPC bits received by the Node B will be random, breaking the inner-loop power control and potentially increasing the transmitted power of the weak link unnecessarily.

Because the inner loop at each Node B responds to the TPC commands it receives, cumulative TPC bit errors will cause the Node B transmitted power to drift substantially if the transmitted power levels of each Node B in the active set are left unsynchronized. Optimal downlink capacity is achieved if the values of the transmitted power of all the Node Bs in the active set are the same or nearly the same. If the transmitted power levels are not kept synchronized, the relative power spread between radio links increases, reducing downlink system capacity and increasing the probability of dropped signals during handover.

The UMTS standard specifies a downlink power adjustment procedure for adjusting the Node B transmitted power of the radio links in the active set. Although the UMTS standard defines the parameters, ranges and accuracy of the power adjustment procedure, the standard leaves open the specific method used to compute and apply the adjustment corrections.

There is a desire for a method that can adjust downlink transmitted power so that the values at each Node B in the active set is balanced.

SUMMARY OF THE INVENTION

The present invention is directed to an algorithm for calculating a correction value to be applied to a given slot in an adjustment period for power correction. A predetermined aggregate amount of power adjustment to be applied over the adjustment period is divided to determine an individual correction value that can be applied to single slots, each slot having a corresponding slot number, in the adjustment period. Contiguous slots in the adjustment period are grouped into segments so that the adjustment period comprises at least two segments. The algorithm determines a power target value for each segment.

In one embodiment, each segment is given a corresponding segment number and the power target value increases linearly based on the segment number. The algorithm applies the correction value to consecutive slots within the segment until the accumulative applied correction value reaches the power target value for that segment. As a result, correction is applied within each segment as quickly as possible, but is limited by the power target value for that segment. The algorithm ensures that any corrections are smoothly distributed over the adjustment period with respect to the segments and yet are quickly distributed among the slots within each segment. The algorithm may also check the total amount of power adjustment applied to the slots over a sliding adjustment window to make sure that the total amount of adjustment applied to the slots in the adjustment window do not exceed a predetermined maximum threshold.

DETAILED DESCRIPTION

Figure 1:
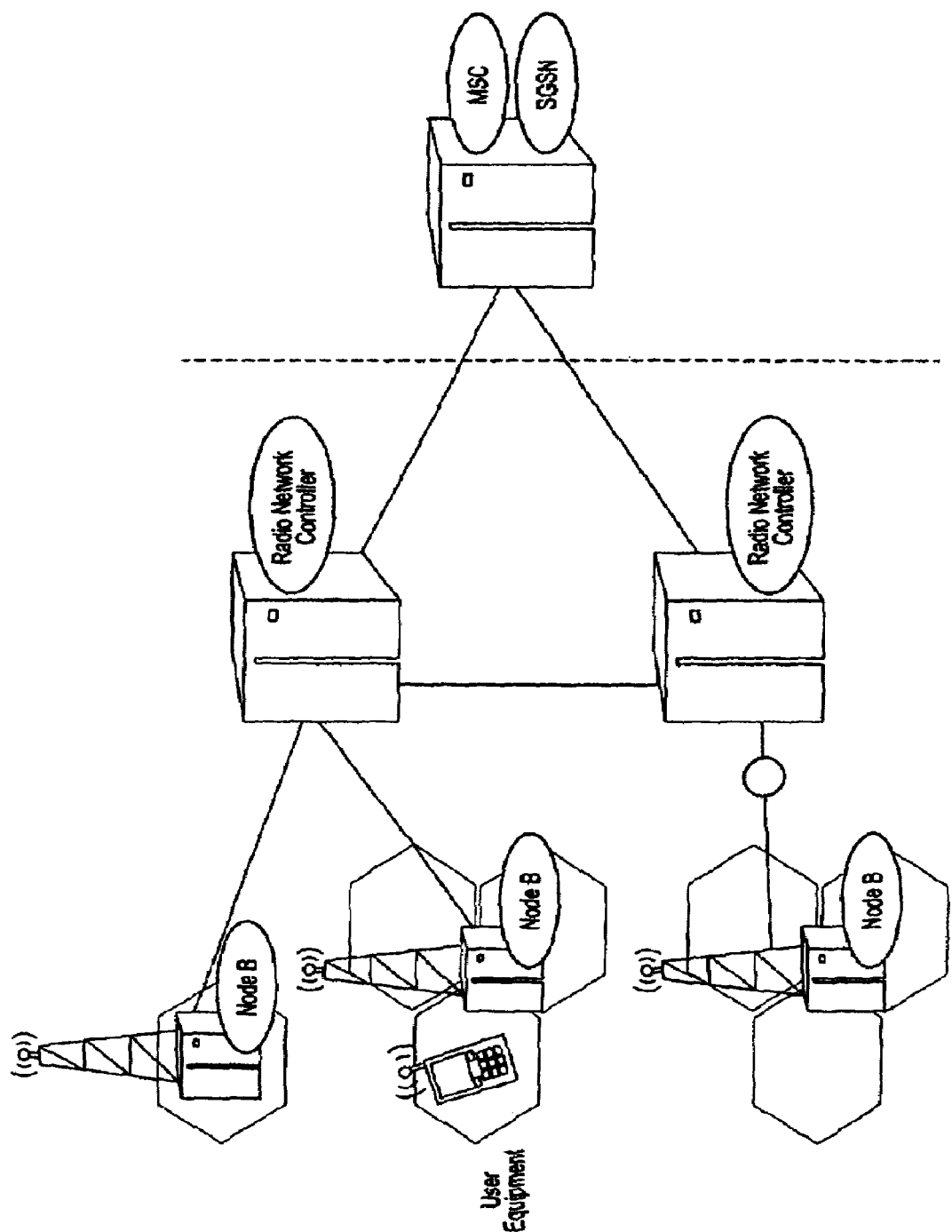
FIG. 1 is a representative diagram of cells and nodes operating one embodiment of the invention.
Figure 2:
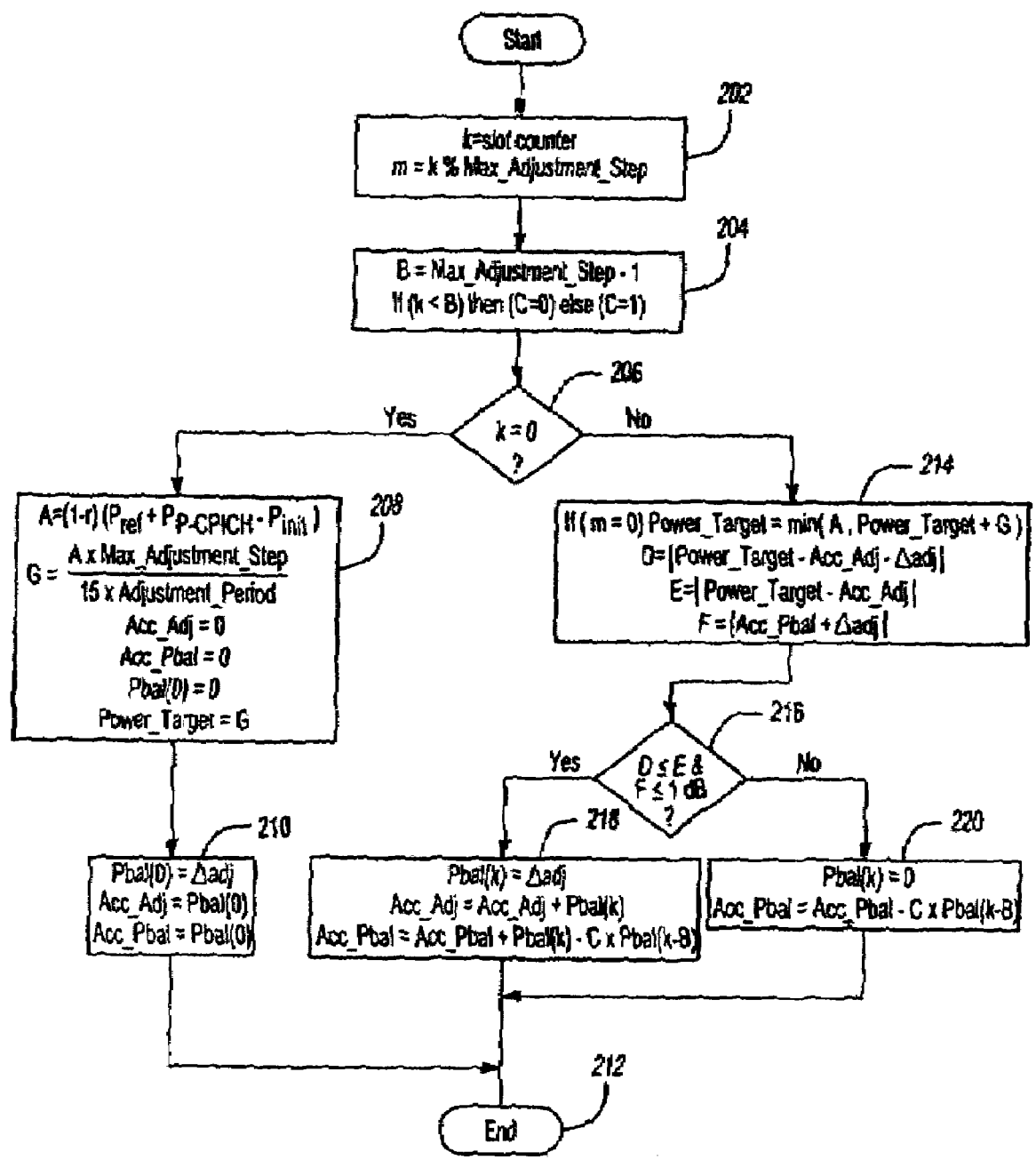
FIG. 2 is a flow diagram illustrating one embodiment of the inventive algorithm.

FIG. 2 is a flow diagram illustrating an algorithm for adjusting the downlink transmitted power to equalize the values at each Node B in an active set. For purposes of illustration only, the example described below focuses on power adjustment according to parameters defined by the UMTS standard, but the inventive algorithm can be applied to any wireless system using any standard. Parameters and formulas defined by the UMTS standard and referenced in this description are defined below in Table 1.

TABLE 1

| UMTS Parameter Name or Formula | Definition of Parameter |
| --- | --- |
| $\sum_{k=\text{Adjustment\_Period}} P_{bal}(k) = (1-r)(P_{ref} + P_{P-CPICH} - P_{init})$ | aggregate amount of power adjustment correction to be superimposed on the inner loop power control adjustments |
| $P_{bal}(k)$ | amount of power correction applied in slot k |
| Adjustment_Period | period in which a power adjustment correction $\Sigma P_{bal}(k)$ is applied (range 1 to 256 frames) |
| r | adjustment ratio defining the convergence rate used in the adjustment period |
| $P_{ref}$ | downlink reference power relative to the P-CPICH to which the power adjustment algorithm should converge to (range -35 dB to 15 dB) |
| $P_{P-CPICH}$ | primary common pilot absolute power |
| $P_{init}$ | code absolute power of the last slot of the previous adjustment period |
| Max_Adjustment_Step | maximum number of slots in which the magnitude of the power balancing correction cannot exceed 1 dB (range 1 to 10 slots) |

In this embodiment, the UMTS standard calls for a periodic procedure at a given Node B to compute the aggregate downlink power correction $\Sigma Pbal(k)$, which is the total desired power correction value, over the number of frames defined by the Adjustment_Period parameter. Generally, the aggregate downlink power correction is computed before the adjustment period starts and is applied across the adjustment period by adding a correction value Pbal(k) to the downlink inner loop power control at each slot k. The UMTS standard also limits the sum of the adjustment corrections over an adjustment window encompassing Max_Adjustment_Step number of slots to 1 dB or less. As shown in Table 1, the adjustment window Max_Adjustment_Step has a fixed number of slots that are a subset of the slots in the adjustment period.

The adjustment period is also divided into two or more segments. Each segment is a group of contiguous slots in which correction is conducted as fast as possible by the inventive algorithm. In one embodiment, the number of slots in each segment is the same as the number of slots in the adjustment window Max_Adjustment_Step.

As a practical matter, the actual accumulative correction may not actually reach the target $\Sigma Pbal$ at the end of the adjustment period, particularly when $\Sigma Pbal$ is large, due to quantization effects and the Max_Adjustment_Step adjustment window limitation. The algorithm will, however, ensure that the maximum possible accumulative correction is applied during the adjustment period as fast as possible within each segment.

In this embodiment, the UMTS standard calls for a periodic procedure at a given Node B to compute the aggregate applied correction $\Sigma Pbal(k)$ over the number of slots defined by the Adjustment_Period parameter. With the aggregate correction value $\Sigma Pbal(K)$ calculated by a given Node B being known, the inventive algorithm calculates a correction value Pbal(k) to be applied to a given slot k in the adjustment period. The algorithm calculates the correction value Pbal(k) so that the aggregate correction is distributed at a rate that constitutes a compromise between fast correction and smooth correction. Correcting power imbalances as fast as possible can prevent the TPC bits in a weak radio link from exhibiting random characteristics, but keeping the correction characteristic smooth provides decoupling between the power adjustment procedure and the downlink inner loop, avoiding conflicts between the two mechanisms. For example, if the inner loop must raise transmitted power quickly while the adjustment algorithm wishes to lower the transmitted power, the applied correction value Pbal(k) should be smaller than the increased transmitted power adjustment in the inner loop to prevent the applied correction value Pbal(k) from cancelling out the inner loop power adjustment even if the aggregate adjustment $\Sigma Pbal(k)$ is large.

The inventive algorithm sets forth a compromise between fast correction and smooth correction, tracking power imbalances quickly without cancelling out power adjustments in the inner loop. Generally, the adjustment period is divided into segments having the same number of slots as the adjustment window Max_Adjustment_Step. A power target value Power_Target is computed for each segment and varies linearly according to the segment number in the adjustment period. Within each segment, the correction value Pbal(k) is applied as fast as possible (e.g., applied to consecutive slots within each segment). The UMTS standard also limits the sum of the adjustment corrections over the adjustment window encompassing Max_Adjustment_Step number of slots to 1 dB or less.

In other words, the inventive algorithm allows fast correction of power adjustments by applying the correction value Pbal(k) to consecutive slots k while smoothing the correction by setting a power target value Power_Target that varies linearly based on a segment number, where each segment has multiple slots. Setting the target value Power_Target according to segment number, rather than according to slot number, does cause the correction to occur less smoothly than an algorithm that sets a target value based on slot number, but the inventive algorithm also provides faster correction by allowing consecutive slots within a segment to be corrected.

A specific example of the inventive method will be explained below. For purposes of explanation only, it is assumed in this example that the total number of slots available in an adjustment period is 15×Adjustment_Period. Further, in this example, it is assumed that the adjustment window Max_Adjustment_Step=8 slots.

To control the correction amount applied to a given slot, the algorithm calculates an proposed applied correction value Δadj for a given slot k for each slot so that $$\sum_{k \in \text{Adjustment\_Period}} P_{bal}(k) = (1-r)(P_{ref} + P_{P-CPICH} - P_{init}) \quad \text{Equation 1}$$

The actual value of Δadj may be determined externally based on, for example, the speed of the mobile units, channel conditions, the amount of Doppler in the system, and other relevant parameters.

Given that the aggregate correction is ΣPbal(k), then the target power per segment is equal to:

$$\text{Segment\_Power\_Target} = \frac{(1-r)(P_{ref} + P_{P-CPICH} - P_{init}) \times \text{Max\_Adjustment\_Step}}{(15 \times \text{Adjustment\_Period})} \quad \text{Equation 2}$$

To smooth the correction between segments, the algorithm also monitors a power target value Power_Target having a linear relationship with the segment number in which the correction amount is applied:

$$\text{Power\_Target}(s) = \min\lfloor (1-r)(P_{ref} + P_{P-CPICH} - P_{init}),$$
$$\text{Power\_Target}(s-1) + \text{Segment\_Power\_Target} \rfloor \quad \text{Equation 3}$$

where s corresponds to the segment number in a given adjustment period (e.g., s=1 is the first segment in the adjustment period). Equation 3 shows selects either the total amount of power correction or a target value based on the segment number, whichever is smaller. As corrections are applied to consecutive slots, the accumulative applied correction value approaches ΣPbal. Once the accumulative applied correction value reaches the target ΣPbal, the remaining slots in the adjustment period receive a correction value of Pbal(k)=0.

FIG. 2 illustrates one possible implementation of the inventive algorithm 200 for computing an applied correction value Pbal(k) for a given slot. The algorithm 200 may be repeated, incrementing the slot counter k each time, until a correction value has been calculated for each slot in the adjustment period.

Referring to FIG. 2, the algorithm notes the slot value k and computes a value m corresponding to a local index value in the segment and acting as a slot counter module (block 202). The algorithm also defines B=Max_Adjustment_Step −1 (block 204). The algorithm then compares the value B with the slot number k. If the slot number k is less than B (that is, if the current slot number is less than the number of slots in the sliding Max_Adjustment_Step adjustment window minus one), then the algorithm sets a value C to equal 0. Otherwise, C is set to 1 (block 204). The value B is used later in the algorithm to calculate an accumulated applied correction value Acc_Pbal and determine whether the accumulative applied correction value Acc_Pbal has reached the maximum value for the sliding Max_Adjustment_Step window.

The algorithm then checks whether the slot number k=0, indicating that the slot k is the first slot in the adjustment period (block 206). If k=0, then an accumulative adjustment value Acc_Adj, which represents the total amount of correction applied during a given adjustment period, and the accumulative applied correction value Acc_Pbal, which is used to calculate the total amount of correction applied in the sliding adjustment window Max_Adjustment_Step, are set to 0 (because there have been no previous slots in the adjustment period). Other values calculated by the algorithm include a value A, which is the total amount of correction for the adjustment period, and G, which is the segment power target value as shown in Equation 2. The applied correction value for the first slot in the adjustment period Pbal(0) is also set to 0, and the power target value Power_Target is set equal to G (block 210) because the slot is the first slot in the adjustment period.

Once all of the values are initialized (block 208), the algorithm sets the applied correction value Pbal(0) to be equal to the proposed applied correction value Δadj (block 210). The accumulated adjusted value Acc_Adj and the accumulated applied correction Acc_Pbal are both also set to be equal to Pbal(0). The adjustment cycle for slot k=0 then ends (block 212), priming the algorithm for calculating the applied adjustment value Pbal for the next slot in the adjustment period.

For slot values where k does not equal 0 (i.e., for slots other than the first slot in the adjustment period), the algorithm conducts a different process because there are correction values from previous slots to be taken into account. More particularly, if k does not equal 0 (block 206), the algorithm then checks whether m=0, indicating that the current slot k is the first slot in a given segment. If so, the algorithm sets the power target value Power_Target to be equal to the total desired power adjustment A or the current Power_Target value plus the Segment_Power_Target value, whichever is smaller. If m does not equal 0, indicating that the current slot k is not the first slot of a segment, the Power_Target value is left unchanged.

The algorithm sets values D, E, and F, where value D is the current power target value Power_Target minus both the accumulated adjusted value Acc_Adj (i.e., the amount of adjustment that has already taken place in the adjustment period) and the proposed applied correction value Δadj; value E is the current power target value Power_Target minus the accumulated adjustment value Acc_Adj; and value F is the sum of the accumulated applied correction value Acc_Pbal and the proposed adjustment value Δadj (block 214). Note that value E reflects the total amount of adjustment applied so far in the adjustment period.

The algorithm then checks whether value D is less than value E and whether value F is less than or equal to 1 dB or some other maximum permissible correction value (block 216). If value D is greater than E, this indicates that the proposed applied correction value Δadj would move the accumulated adjustment value Acc_Adj away from, rather than toward, the Power_Target value. Further, the algorithm checks whether the proposed applied correction value will bring the total amount correction applied so far in the sliding adjustment window Max_Adjustment_Step above the maximum total correction amount for the adjustment window (1 dB in this example).

If the criteria in block 216 are both true, then the algorithm sets the applied correction value Pbal(k) for that slot to be equal to the proposed applied correction value Δadj (block 218). The algorithm also updates the accumulated adjustment value Acc_Adj by adding the applied correction value Pbal(k) for the slot to the previous value for Acc_Adj. The accumulated applied correction value Acc_Pbal is also updated to reflect the applied correction value Pbal(k) for slot k by adding the applied correction value Pbal(k) of the current slot k to the previous accumulated applied correction value Acc_Pbal and then subtracting the applied correction value used in the first slot of the Max_Adjustment_Step adjustment window; in other words, the Acc_Pbal value treats the current slot k as the last slot in the sliding adjustment window in determining whether the total correction amount in the adjustment window has reached its maximum. This recalculation slides the adjustment window so that the current slot k is always the last slot in the adjustment window. Note that if C is set equal to zero (block 204), which would occur if the total number of slots corrected so far is less than the number of slots in the adjustment window, then the subtraction step is not needed.

If either of the criteria in block 216 are false (that is, if the proposed applied correction value Δadj actually moves the accumulated adjustment value Acc_Adj farther away from the target Power_Target, as shown by comparing values D and E, or if the proposed applied correction value Δadj is larger than the allowable correction value for the entire adjustment window, as indicated by value F), then the algorithm sets the applied correction value Pbal to 0 so that no correction value will be added for slot k=0 (block 220). The accumulated adjustment value Acc_Adj is updated in a similar manner as in block 220 except that no value for Pbal(k) is subtracted because Pbal(k) is equal to 0 in this case. The algorithm then finishes (block 216) and readies itself for determining the correction value for the next slot.

Thus, by incrementing the target value Power_Target at the beginning of each new segment (by adding the Segment_Power_Target value to the current Power_Target value in block 214) and by applying the applied correction value Pbal(k) to consecutive slots in the segment to correct downlink power as fast as possible within each segment, the inventive algorithm provides a compromise between algorithms that attempt to maximize solely either smooth power correction or fast power correction. The inventive algorithm creates a compromise between smooth and fast power correction by distributing smooth power correction over segments rather than over the individual slots in the adjustment period.

Table 2 below illustrates one example of an application of the hybrid adjustment method according to one embodiment of the invention. In this example, the sliding Max_Adjustment_Step adjustment window is set at 8 slots (that is, any 8 consecutive slots in the adjustment period cannot have a total correction amount exceeding 1 dB) and the accumulated applied correction value ΣPbal is 2.3 dB. The proposed adjustment value Δadj for each slot is selected to be 0.2 dB, and the adjustment period is two frames, which corresponds to 30 slots in this example. From Equation 1, the Segment_Power_Target for each segment is calculated to be in this example:

$$\text{Segment\_Power\_Target} = \frac{2.3 \text{ dB} \times 8}{(15 \times 2)} = 0.613 \text{ dB} \qquad \text{Equation 4}$$

TABLE 2

| Slot Number k | Power_Target [dB] | Acc_Adj [dB] | $P_{bal}(k)$ [dB] | $Acc\_P_{bal}$ $\sum_{i=max(0,k-7)}^{k} P_{bal}(i)[dB]$ |
| --- | --- | --- | --- | --- |
| 0 | 0.613 | 0.100 | 0.100 | 0.100 |
| 1 | 0.613 | 0.200 | 0.100 | 0.200 |
| 2 | 0.613 | 0.300 | 0.100 | 0.300 |
| 3 | 0.613 | 0.400 | 0.100 | 0.400 |
| 4 | 0.613 | 0.500 | 0.100 | 0.500 |
| 5 | 0.613 | 0.600 | 0.100 | 0.600 |
| 6 | 0.613 | 0.600 | 0.000 | 0.600 |
| 7 | 0.613 | 0.600 | 0.000 | 0.600 |
| 8 | 1.227 | 0.700 | 0.100 | 0.600 |
| 9 | 1.227 | 0.800 | 0.100 | 0.600 |
| 10 | 1.227 | 0.900 | 0.100 | 0.600 |
| 11 | 1.227 | 1.000 | 0.100 | 0.600 |
| 12 | 1.227 | 1.100 | 0.100 | 0.600 |
| 13 | 1.227 | 1.200 | 0.100 | 0.600 |
| 14 | 1.227 | 1.200 | 0.000 | 0.600 |
| 15 | 1.227 | 1.200 | 0.000 | 0.600 |
| 16 | 1.840 | 1.300 | 0.100 | 0.600 |
| 17 | 1.840 | 1.400 | 0.100 | 0.600 |
| 18 | 1.840 | 1.500 | 0.100 | 0.600 |
| 19 | 1.840 | 1.600 | 0.100 | 0.600 |
| 20 | 1.840 | 1.700 | 0.100 | 0.600 |
| 21 | 1.840 | 1.800 | 0.100 | 0.600 |
| 22 | 1.840 | 1.800 | 0.000 | 0.600 |
| 23 | 1.840 | 1.800 | 0.000 | 0.600 |
| 24 | 2.300 | 1.900 | 0.100 | 0.600 |
| 25 | 2.300 | 2.000 | 0.100 | 0.600 |
| 26 | 2.300 | 2.100 | 0.100 | 0.600 |
| 27 | 2.300 | 2.200 | 0.100 | 0.600 |
| 28 | 2.300 | 2.300 | 0.100 | 0.600 |
| 29 | 2.300 | 2.300 | 0.000 | 0.500 |

Table 2 shows the Power_Target for each segment, the applied correction value Pbal(k) for each slot and the accumulated applied correction value ΣPbal. As shown in Table 2, the applied correction values Pbal(k) are distributed as fast as possible within each segment, in consecutive slots, until it reaches the Power_Target value for that segment. Further, the Power_Target for each segment remains the same for all the slots in that segment, with the Power_Target value being increased at the first slot of each segment. Thus, the Power_Target value increases linearly with respect to the segment number (not the slot number, as would be the case for an algorithm optimized for smooth corrections). No applied correction value Pbal(k) is added to the slot unless the result would bring the accumulated applied correction value Acc_Adj closer to the Power_Target value for that segment.

As a result, the inventive algorithm tracks and corrects any power imbalances among the node Bs while balancing the correction rate between a fast correction and a smooth correction by maximizing power correction speed within segments in the adjustment period rather than over the whole adjustment period. The inventive algorithm therefore tracks and corrects power imbalances quickly while minimizing interactions with the power control inner loop.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, this method, system and portions thereof and of the described method and system may be implemented in different locations, such as network elements, the wireless unit, the base station, a base station controller, a mobile switching center and/or radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

We claim:

1. A method for adjusting transmitted power in a channel over an adjustment period having a plurality of slots, each slot having an associated slot number, comprising:
   dividing the adjustment period into a plurality of segments, each segment having a defined number of slots and a corresponding segment number;
   determining a power target value for each segment, wherein the power target value varies linearly based on the segment number;
   calculating an applied correction value to be added to a given slot;
   adding the applied correction value to the given slot if adding the applied correction value to an accumulative adjustment value brings the accumulative adjustment value toward the power target value;
   dividing a total correction value by the number of segments in the adjustment period to determine a segment power target value corresponding to a power correction to be applied to each segment;
   detecting whether the given slot is a first slot in a given segment; and
   adding the segment power target value to a previous power target value to obtain the power target value for the given segment.

2. A method for adjusting transmitted power in a channel over an adjustment period having a plurality of slots, each slot having an associated slot number, comprising:
   dividing the adjustment period into a plurality of segments, each segment having a defined number of slots and a corresponding segment number;
   determining a power target value for each segment, wherein the power target value varies linearly based on the segment number;
   calculating an applied correction value to be added to a given slot;
   adding the applied correction value to the given slot if adding the applied correction value to an accumulative adjustment value brings the accumulative adjustment value toward the power target value;
   defining a proposed applied correction value;
   calculating a first reference value by subtracting the accumulative adjustment value and the proposed applied correction value from the power target value;
   calculating a second reference value by subtracting the accumulative adjustment value from the power target value; and
   conducting the adding step if the first reference value is less than the second reference value.

3. The method of claim 2, further comprising the step of adding the applied correction value to the accumulative adjustment value to update the accumulative adjustment value.

4. The method of claim 3, wherein the adding step adds the applied correction value to consecutive slots in the segment until the accumulative applied correction value reaches a maximum threshold.

5. A method for adjusting transmitted power in a channel over an adjustment period having a plurality of slots, each slot having an associated slot number, comprising:
   dividing the adjustment period into a plurality of segments, each segment having a defined number of slots and a corresponding segment number;
   determining a power target value for each segment, wherein the power target value vanes linearly based on the segment number;
   calculating an applied correction value to be added to a given slot;
   adding the applied correction value to the given slot if adding the applied correction value to an accumulative adjustment value brings the accumulative adjustment value toward the power target value;
   defining an accumulative applied correction value as a sum of applied correction values over a selected number of slots in the adjustment period;
   adding the applied correction value to the given slot if adding the applied correction value to the accumulative adjustment value brings the accumulative adjustment value toward the power target value and if adding the applied correction value to the accumulative applied correction value keeps the accumulative applied correction value below a maximum threshold; and
   ignoring the applied correction value for the given slot if adding the applied correction value to the accumulative adjustment value brings the accumulative adjustment value away from the power target value; and
   ignoring the applied correction value for the given slot if adding the applied correction value to the accumulative applied correction value sends the accumulative applied correction value above the maximum threshold.

6. The method of claim 5, further comprising the step of adding the applied correction value to the accumulative adjustment value to update the accumulative adjustment value.

7. The method of claim 5, wherein the selected number of slots used to determine the accumulative applied correction value are consecutive slots in an adjustment window having a fixed number of slots that is less than the number of slots in the adjustment period.

8. The method of claim 7, wherein the adjustment window has a first slot and a last slot, and wherein the adjustment window is set as a sliding window such that the given slot is set to be the last slot in the adjustment window.

9. The method of claim 8, wherein the sliding adjustment window is set by:
   adding the applied correction value of the last slot in the adjustment window to the accumulative applied correction value; and
   subtracting the applied correction value of a first slot in the adjustment window, wherein the adding and subtracting steps update the accumulative applied correction value.

10. The method of claim 7, wherein the number of slots in at least one segment is the same as the number of slots in the adjustment window.

11. A method for adjusting transmitted power in a wireless downlink channel over an adjustment period having a plurality of slots, each slot having an associated slot number, comprising:

dividing the adjustment period into a plurality of segments, each segment having a defined number of contiguous slots and a corresponding slot number;

dividing a total correction value by the number of segments in the adjustment period to determine a segment power target value;

determining a power target value for each segment by detecting whether a slot is a first slot in a given segment and adding the power target value to a previous power target value such that the power target value varies linearly based on the segment number;

defining a proposed applied correction value;

calculating a first reference value by subtracting the accumulative adjustment value and the proposed applied correction value from the power target value;

calculating a second reference value by subtracting the accumulative adjustment value from the power target value;

adding the proposed applied correction value to the given slot as an applied correction value if the first reference value is less than the second reference value, indicating that the applied correction value will bring the accumulative adjustment value toward the power target value; and adding the applied correction value to the accumulative adjustment value to update the accumulative adjustment value.

12. The method of claim 11, further comprising the steps of:

defining an accumulative applied correction value as a sum of the applied correction values in an adjustment window having a fixed number of slots that is fewer than the number of slots in the adjustment period;

adding the applied correction value to the given slot if adding the applied correction value to the accumulative adjustment value brings the accumulative adjustment value toward the power target value and if adding the applied correction value to the accumulative applied correction value keeps the accumulative applied correction value below a maximum threshold;

ignoring the applied correction value for the given slot if adding the applied correction value to the accumulative adjustment value brings the accumulative adjustment value away from the power target value; and ignoring the applied correction value for the given slot if adding the applied correction value to the accumulative applied correction value sends the accumulative applied correction value above the maximum threshold.

13. The method of claim 12, wherein the adjustment window has a first slot and a last slot, and wherein the adjustment window is set as a sliding window such that the given slot is set to be the last slot in the adjustment window by:

adding the applied correction value of the last slot in the adjustment window to the accumulative applied correction value; and subtracting the applied correction value of a first slot in the adjustment window, wherein the adding and subtracting steps update the accumulative applied correction value.

14. The method of claim 12, wherein the number of slots in each segment is the same as the number of slots in the adjustment window.

* * * * *